(12) United States Patent
Aittamaa et al.

(10) Patent No.: US 6,458,900 B1
(45) Date of Patent: Oct. 1, 2002

(54) PROCESS FOR PREPARING POLYOLEFINS

(75) Inventors: Juhani Aittamaa; Harri Järvelin, both of Helsinki; Timo Nyman, Vantaa, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/623,369

(22) PCT Filed: Mar. 4, 1999

(86) PCT No.: PCT/FI99/00173
§ 371 (c)(1),
(2), (4) Date: Sep. 1, 2000

(87) PCT Pub. No.: WO99/45036
PCT Pub. Date: Sep. 10, 1999

(30) Foreign Application Priority Data

Mar. 4, 1998 (FI) .................................................. 980497
Mar. 4, 1998 (FI) .................................................. 980498
Mar. 4, 1998 (FI) .................................................. 980499

(51) Int. Cl.[7] .................................................. C08F 2/34
(52) U.S. Cl. ........................ 526/71; 526/68; 526/77; 526/65; 526/901
(58) Field of Search ............................. 526/68, 77, 71, 526/65, 901

(56) References Cited

U.S. PATENT DOCUMENTS 4,200,714 A * 4/1980 Mahoney et al. ............. 526/68
4,650,814 A * 3/1987 Keller .......................... 518/703
4,740,550 A  4/1988 Foster

FOREIGN PATENT DOCUMENTS

JP  A8151413   6/1996
WO  A1-9858975   12/1998

OTHER PUBLICATIONS

WPI Derwent, Multi–stage polymerisation of olfin—is carried out in presense of hydrogen where gas discharged from process is passed through hydrogen (1996).

* cited by examiner

Primary Examiner—David W. Wu
Assistant Examiner—William K. Cheung
(74) Attorney, Agent, or Firm—Birch, Stewart, Kolasch & Birch, LLP (57) ABSTRACT

The invention relates to a process for the production of polyolefins in a reactor system which comprises at least one gas-phase reactor with at least one monomer is polymerized. According to the process, there is fed into the gas-phase reactor the monomer to be polymerized and possibly a polymer-containing fluid. According to the invention, before being fed into the gas-phase reactor, the fluid is subjected to a phase change in order to separate uncondensed compounds from liquid and possibly solid compounds. The gas including the uncondensed compound is recovered, and hydrogen is separated from the gas by membrane separation. The invention can be applied to the removal of hydrogen from the circulation gas of a gas-phase reactor, for example in order to change the polyolefin grade to be produced.

37 Claims, 5 Drawing Sheets

PROCESS FOR PREPARING POLYOLEFINS

This application is the national phase under 35 U.S.C. § 371 of PCT International Application No. PCT/FI99/00173 which has an International filing date of Mar. 4, 1999, which designated the United States of America.

The present invention relates to the production of polyolefins. The invention relates in particular to a process according to the preamble of claim 1 for the production of polyolefins in a reactor system which comprises at least one gas-phase reactor wherein at least one monomer is polymerized. According to the process, hydrogen and possibly other gaseous or vaporized light components are separated from the fluid being directed to the gas-phase reactor.

The invention is applicable to the separation of light components from the stream between two polymerization reactors and to the removal of volatile (uncondensable) components from the circulation gas of a gas-phase reactor used for the preparation of polyolefins.

Olefins are polymerized into polyolefins in a gas-phase reactor in the presence of, for example, Ziegler-Natta type catalysts or metallocene catalysts. The forming polymer mass, which contains an active catalyst, is fluidized in :a fluidized bed reactor by using a hydrocarbon stream. This stream contains a monomer (typically ethylene or propylene) and possibly a comonomer ($C_2$–$C_{10}$ olefins or diolefins, preferably ethylene, propylene, 1-butene or hexene), as well as hydrogen, which controls the molecular weight. The hydrocarbon stream may also contain high concentrations of a substance inert in the reaction (typically nitrogen or propane).

During the polymerization there is withdrawn from the gas-phase reactor a gas stream which contains at least some amount of unreacted monomer and which is returned to the gas-phase reactor as circulation gas. Most of the heat of reaction is removed by cooling this circulation gas. In order to ensure sufficient cooling efficiency and to achieve suitable fluidization velocities, the circulation gas stream is typically quite large. From the viewpoint of the functioning of the condenser it is preferable to remove from the stream the components with the lowest molecular weights, in particular hydrogen.

Nowadays hydrogen is removed from the gas-phase reactor either from the circulation gas stream or from the recovery stream together with the purge stream.

There are considerable disadvantages associated with prior art solutions. Thus the most typical method of lowering the concentration of hydrogen in the reactor is to increase the off-gas stream of accumulating inerts to a level close to the maximum capacity of the gas removal system. The gas removed is directed, for example, to the flare for burning or as feed to cracking. These methods are bad, expensive and slow, since both chemicals and production capacity are lost, which is due to the fact that a product of deficient quality is produced.

A further disadvantage of the prior art is that, when a typically relatively low concentration of hydrogen is lowered, the gases leaving together with the hydrogen cause a large financial loss to the polyolefin plant.

The accumulation of hydrogen and other light components in the gas streams of the polymerization process constitutes a problem also when polyolefins are prepared in a plant where two reactors are coupled together. Owing to the light components, such as hydrogen and inert compounds, present in the stream between the reactors, all products cannot be prepared by directing the mixture emerging from one reactor directly to the following gas-phase reactor. The reactor product is therefore directed to a product separator, where its pressure is lowered, whereupon the liquid possibly arriving together with the product vaporizes at least in part, or the gas expands and is recyclable to the first reactor. The pressure of the recycled stream is raised by using a compressor. Owing to the recycling, inert components tend to accumulate in the reactor.

In both of the cases mentioned above, particularly significant among the light components are hydrogen and lower alkanes, such as methane, ethane and propane, as well as nitrogen and other inert gases. Hydrogen is used for controlling the molar mass of the polymer, and the amount used varies according to the grade of the polymer. Reducing the proportion of hydrogen in the gas-phase reactor feed is important in situations in which it is desired to prepare long-chain polymers in a gas phase.

The object of the present invention is to eliminate the disadvantages of the prior art and to provide a novel process for the preparation of polyolefins in a reactor system having at least one gas-phase reactor.

The invention is based on the basic idea that hydrogen and possible other light components are separated by membrane separation from the fluid (liquid or gas stream) being fed into the gas-phase reactor, which fluid can comprise the circulation gas stream of the reactor or the effluent of the preceding reactor.

The use of membrane systems for the separation of hydrogen from process streams of polyolefin reactors is known per se from JP published application 08/151.413. In the said prior known process, gas to be separated under a high pressure from a gas-phase reactor is treated in a high-pressure membrane system to remove hydrogen, whereafter the gas stream is returned to the reactor.

The known technical solution has the disadvantage of a low degree of separation. Since the gas is separated under a high pressure, the polymer product will, even after the first separation step, contain volatile compounds, such as polymerization diluent and unreacted monomer, which have to be removed from the polymer separately. Also, no mention of the use of the process in connection with a grade change in the gas-phase reactor can be found in the publication, and evidently it is not applicable for this purpose, since in a separation carried out under a high pressure, relatively large amounts of monomer are left in the product polymer.

There are also other previously known membrane solutions. Thus, U.S. Pat. No. 4,740,550 describes a process for the preparation of a propylene-ethylene copolymer so that the propylene is first polymerized in two reactors and is then fed together with ethylene into a third reactor. According to the publication, hydrogen is removed from the circulation of the third reactor (i.e. the last gas-phase reactor) by using a hydrogen-selective hydrogen-removing membrane. In this known solution, the gas coming from the reactor and containing, for example, hydrogen, ethylene and propylene, is directed to a gas scrubber, to which ethylene and propylene which have condensed in the scrubber and have thereafter been cooled are recycled. The separation of the hydrogen-containing gas from the condensed components is thus based on the adding of cold liquid into the scrubber.

The present invention differs from the prior art in that the fluid to be fed into the gas-phase reactor is subjected, before being fed into the reactor, to a phase change in order to separate uncondensable compounds from liquid and possibly solid compounds. After at least a partial vaporization or condensation of the fluid, the gas made up of uncondensed and possibly vaporized compounds is recovered and; directed to membrane separation.

When it is desired to treat the stream between two reactors by using the option according to the invention, in accordance with prior art the product of the first reactor is directed to separation cyclones or corresponding apparatus for separating the reaction medium. According to the present invention, instead of vaporizing any possible liquid and directing it to a compressor, as in the prior art, a portion of the possible liquid is vaporized or the gas is allowed to expand in one or more steps, and the obtained gases are directed through a membrane system, whereby most of the hydrogen is removed. The hydrocarbons separated from the hydrogen are returned into the exit stream from the first reactor, and the said stream (fluid) is then fed into the gas-phase reactor. Thus it is possible to prepare from the effluent of the first reactor an intermediate product which can as such be fed into the second reactor (gas-phase reactor).

In the treatment of the circulation gas of the gas-phase reactor, there is withdrawn from the reactor a first gas stream, which is cooled to a first condensing temperature to condense it at least in part and to separate the liquid from the gas. Including the first gas stream, uncondensed compounds are separated in a membrane separator unit from the gas obtained from its condensation. The components obtained from the membrane separation are treated separately, and they are returned to the gas-phase reactor or are directed to distillation or a similar further treatment.

More specifically, the present invention is mainly characterized in what is stated in the characterizing part of Claim 1.

Considerable advantages are gained by means of the present invention. Thus, the production capacity of the gas-phase reactor will increase by at least 20%, i.e. to correspond to the capacity of a reactor system equipped with a cooling circulation operating with partial condensation. Control of the hydrogen concentration is sensible and economical. When the circulation gas compressor stops, the gas-phase reactor can be emptied rapidly in order to prevent the formation of agglomerates, since components can be removed from the hydrogen control cycle in a liquid phase. The off-gas is easily distilled. since it contains very little hydrogen. If the gas-phase reactor feed is in a liquid phase, there is saved in the polymer feed system (including pneumatic conveying) the flash tank, the removal of dust from the gas and the recovery compressor, and the distillation columns are reduced. If partial vaporization is installed in their place, even then the required gas treatment system will be substantially smaller and more economical than in the prior art. This is the case because hydrogen can be removed effectively from the gas-phase circulation. The invention is especially advantageously applicable to situations in which the diluent used in the gas-phase reactor is a heavy hydrocarbon such as butane, and/or a heavy comonomer such as 1-butene or 1-octene.

The condensation can be made more affective through the removal of light components, in particular hydrogen, from the circulation stream of the gas-phase reactor.

By means of the present invention, the change of grade of the polyolefin prepared in the reactor can be sped up. Although membranes usually do not make possible as precise a separation as, for example, distillation, a sufficiently high degree of separation in terms of polymer grade change can be achieved by the solution according to the invention. At the same time the costs of investment in equipment can be maintained low. By means of the invention, at least approx. 50%, preferably approx. 80–90%, of the hydrogen present in the gas stream subjected to treatment is removed.

In connection with the present invention it has been observed that a result especially advantageous in tenns of grade change is achieved by feeding into the membrane separator system a gas stream the composition of which substantially corresponds to the composition in the gas-phase reactor as regards small-molecular components. By "small-molecular" components is meant hydrogen and/or nitrogen, as well as monomers and/or diluent residues, which in a gas-phase reactor are adsorbed to polymer particles. Such a gas stream is obtained either by withdrawing a gas stream from the top of the gas-phase reactor or by lowering the pressure of the reactor effluent and by separating the gas phase from the solid phase. The proportion of small-molecular components remains substantially unchanged.

In the above-mentioned JP published application, the system is placed at a point after a product separator operating under high pressure, in which case it has been necessary to provide a separate cycle for the system. In the present case, the membrane system is combined with a cycle necessary even otherwise; preferably the membrane system is used for separating hydrogen from the circulation-gas cooling stream or the recovery stream of the gas-phase reactor. This option improves the operation of the condenser in the circulation gas stream, if the membrane system is fitted in the circulation-gas cooling stream. If the membrane system is placed in the recovery stream, a compressor even otherwise needed is utilized, and thus a good operating environment is created for the membrane system. By both methods the speed of polymer grade change is increased, and thereby the profitability of the plant is improved. By means of the invention the costs incurred from a separate cycle constructed for the membrane system are avoided.

In an operation according to the JP publication, the composition of the gas introduced into membrane separation differs substantially from the small-molecule composition in the gas-phase reactor, since, when the product separation takes place substantially under the reactor pressure, heavy components of the reaction mixture leave the reaction gas in a larger proportion by volume. In a preferred embodiment according to the present invention, product separation takes place under a pressure: substantially lower than the reactor pressure. Thereby the reaction gas leaving together with the product polymer is decreased, and the change in its composition is very slight, since the comonomers and heavy diluent components are substantially entirely vaporized, and only the possibly oligomeric byproducts of the reaction remain in part unvaporized. The mutual proportions of the light, 20 i.e. small-molecular components, such as hydrogen, lower alkanes and alkenes, in particular methane, ethane and ethene, are substantially the same as in the stream obtained from the reactor.

The purity of the product is additionally maximized through the placement of the membrane system at a point after the low-pressure product separator. At the same time the reactive components are exploited maximally by being returned to the polymerization reactor (i.e. gas-phase reactor), where a product is prepared therefrom. The membrane separates from the stream the lightest components and thereby prevents them from accumulating in the circulation. In the present invention it is therefore possible to operate so that the reactor pressure is lowered (if hydrogen is separated from the polymer product and the membrane system is located in the recovery stream).

According to another preferred embodiment, the separation is carried out from the circulation gas of the reactor. In this respect the invention to some degree resembles the process of U.S. Pat. No. 4,740,550; however, the composition of the gas directed to the membrane system is completely different, since in the present invention the condensed lower hydrocarbon compounds are not used for scrubbing the gas.

Considerable advantages are achieved when the present invention is applied to a process made up of at least one loop reactor and a gas phase reactor. Thus, a process implemented according to the invention is economically better than current systems, since the cooling need of the second reactor is smaller. The second reactor is easier to control, and grade changes are more rapid and easier, whereupon less product of a deficient quality is produced. The current compressor between the two successive reactors can be replaced with a considerably smaller one.

The removal of hydrogen at a point between the reactors is especially advantageous in a case in which the latter reactor is operated in such a manner that from the top of the reactor there is withdrawn a gas stream which, after partial or total condensation, is recycled to reactor feed.

The invention will be examined below in greater detail with the help of a detailed description, the accompanying drawings and a few embodiment examples.

As is evident from the above, the invention relates to a novel process for the production of polyolefins in a gas-phase reactor.

According to the first preferred embodiment of the invention, the system is applied to a case in which hydrogen is removed from the circulation gas of a gas-phase reactor by carrying out, in the desired order, a partial condensation of the circulation gas and a treatment of the gas in a membrane separator system.

According to the second preferred embodiment of the invention, the system is applied to a process in which the hydrogen leaving together with the effluent, i.e. the polymerization product, of a first polymerization reactor or polymerization reactor series operated in liquid, vapour, gas or supercritical conditions is separated from the product in the exit stream of the preceding reactor by using a membrane separator before the said stream is fed into the subsequent reactor, which operates in vapour, gas or supercritical conditions.

The process according to the present invention is suitable for use for the preparation of polyolefins, in particular polyethylene and polypropylene, the monomers to be polymerized including ethylene and propylene and the comonomers including propylene and respectively ethylene and, for example, 1-butene, 4-methyl-1-pentene, 3-methyl-1-butene, vinylcyclohexane, cyclopentene, 1-hexene, 1-octene and 1-decene, as well as dienes.

The polymerization reaction is carried out in a gas-phase reactor at en elevated pressure and at an elevated temperature. Thus the pressure is approx. 10–40 bar and the temperature respectively approx. 60–110° C. The polymerization is typically carried out in the presence of a heterogeneous catalyst, in which case, for example, transition metal catalysts such as Phillips-type chromium catalysts, Ziegler-Natta catalysts or metallocene catalysts are used in the production of polyethylene. Metallocene catalysts and Ziegler-Natta catalysts, such as $MgCl_2*TiCl_4$, are also suitable for the polymerization of polypropylene.

The polymerization reaction is carried out in a gas-phase reactor at en elevated pressure and at an elevated temperature. Thus the pressure is approx. 10–40 bar and the temperature respectively approx. 60–110° C. The polymerization is typically carried out in the presence of a heterogeneous catalyst, in which case, for example, transition metal catalysts such as Phillips-type chromium catalysts, Ziegler-Natta catalysts or metallocene catalysts are used in the production of polyethylene. Metallocene: catalysts and Ziegler-Natta catalysts, such as $MgCl_2*TiCl_4$, are also suitable for the polymerization of polypropylene.

In the reactors the medium may be in a liquid, vapour, gas or supercritical state, and the polymers of olefins in a solid or liquid state.

In the first embodiment of the invention, there is withdrawn from a gas-phase reactor a gas stream, which is hereinafter also called the "first gas stream," and a portion, at least 20%, preferably approx. 40–95%, of its condensable compounds are condensed. It is possible to direct to condensation the entire circulation gas stream obtained from the top of the gas-phase reactor, or a portion thereof. As will be described below in greater detail, certain advantages are achieved by withdrawing from the reactor at least two circulation gas streams, of which only one is treated in a membrane unit. If two circulation streams are taken for treatment, the second stream can be returned after cooling directly to the reactor, possibly combined with the reactor feed. The flow rate of the stream treated in the membrane unit is in general approx. 0.1–500%, typically approx. 1–50%, of the amount of the second stream.

According to one embodiment of the present invention, the pressure of the stream being directed to a membrane separator unit is raised before the membrane separation. The pressure of the circulation gas stream is preferably raised before membrane separation in order to promote this separation. A blower, a compressor or a corresponding pressure-raising apparatus can be used for raising the, pressure.

Preferably the light components are separated from the gas stream only after condensation and the separation of the uncondensed components. By means of condensation, heat is removed from the circulation gas stream and the temperature of the gas stream is reduced at least to below the condensation temperature of the heavy components. Typically the gas stream is cooled to approx. 20–70° C. e.g. approx. 25–60° C. Thus there are obtained a liquid stream which contains the condensed compounds and a gas stream which contains light components such as hydrogen, nitrogen and lower alkanes such as ethane and/or methane.

The uncondensed gas stream directed to membrane separation is heated, when so desired, before the membrane separation. Preferably the gas stream is heated to a temperature 5–45° C. higher than the condensation temperature in order to inhibit condensation at the membrane. This option is suitable in particular for hydrogen-selective polymer membranes. Since together with the gas stream there may come fines formed in polymerization, the fines disturbing membrane separation, solids are separated from the gas stream, for example by filtration, at a point before the membrane unit.

According to one embodiment of the present invention, the pressure of the first gas stream is raised before the stream is directed to the heat exchanger.

Preferably the uncondensed portion of the first gas stream from the gas-phase reactor is treated in two successive membrane separator units, in which case the gas stream which is obtained from the first membrane separator unit, and from which uncondensed compounds present in it have been separated, is cooled to a second condensation temperature in order to separate condensable compounds from the gas. This uncondensed portion is directed to the second membrane separator unit, where uncondensed compounds are separated from it. The uncondensed portion is again heated to a temperature preferably 5–45° C. higher than the second condensation temperature, in particular if hydrogen-selective polymer membranes are used in the second separator unit.

According to one embodiment of the present invention, the pressure of the second gas stream is raised before the membrane separation.

The membrane separator units connected in series may have different or similar membrane materials (see below for greater detail).

In the first membrane separator unit, hydrogen, nitrogen and lower alkanes, in particular ethane and/or methane, are removed from the first gas stream or from its uncondensed portion. Preferably there are removed from the uncondensed portion of the first gas stream 20–99% of the hydrogen, nitrogen and ethane and/or methane present therein. The propane or other diluent and possibly propylene are incorporated into the condensing portion of the first gas stream.

In the present embodiment, membrane separator units the membranes of which contain polyamide, polyimide or silicone rubber are used.

Especially preferably the above-mentioned two-stage membrane separation comprises, combined with polymerization, the following steps:

polymerizing the monomers in a gas-phase reactor in the presence of a catalyst;

withdrawing a first gas stream containing at least some amount of unreacted monomer from the gas-phase reactor;

directing the first gas stream, for example via a blower, to a heat exchanger, where it is divided into a second gas stream which contains uncondensed gases and a liquid stream;

separating uncondensed compounds from the second gas stream in a membrane separation unit.

Preferably 20–95% of the uncondensed compounds (including hydrogen) of the second gas stream are removed. As a result of the membrane separation there is thus obtained a third gas stream, which contains 20–95% of the uncondensed compounds of the second gas stream, and a fourth gas stream.

At least a portion of the third gas stream can be fed into the gas-phase reactor. The third gas stream can, for example, be condensed in part, whereupon the uncondensed portion is fed into the gas-phase reactor, whereas he condensed portion is fed at least or only in part into the gas-phase reactor. Preferably the condensed portion is combined with a liquid stream before this stream is fed into the gas-phase reactor. The liquid stream may comprise the liquid stream from the polymerization reactor preceding the gas-phase reactor, the liquid stream condensed from the first gas stream or the liquid stream condensed from the fourth gas stream. Preferably the liquid stream is heated before it is fed into the gas-phase reactor.

Depending on its composition the condensed portion, and respectively the uncondensed portion, can also be directed somewhere else. Thus they may be directed to distillation in order to separate the hydrogen and/or the inerts. They may also be directed to distillation, to the fuel-gas network or to the cracking unit, or be recycled to the polymerization reactor (or another reactor).

According to one embodiment of the present invention the condensing portion is directed to distillation for the separation of light hydrocarbons and hydrogen.

According to one embodiment of the present invention, the pressure of the third gas stream is raised after the membrane separation, before the stream is directed to further treatment.

The uncondensed portion of the third gas stream is directed to membrane separation. The uncondensed portion of the fourth gas stream may be combined with it in order to produce a combined gas stream. According to a preferred embodiment, the pressure of this combined stream is raised by using a compressor, whereafter it is directed to a condenser in order to divide the stream into a fifth gas stream, which contains uncondensed compounds, and a condensed liquid stream. The fifth gas stream is directed to membrane separation in order to separate hydrogen from hydrocarbons, the hydrogen-containing stream being returned to the polymerization reactor preceding the gas-phase reactor.

To summarize the options presented above, the process according to the present invention comprises, among others, the following combinations:

condenser/compressor/membrane (+condenser/membrane);

compressor/condenser/membrane (+condenser/membrane);

condenser/membrane/compressor/condenser/membrane;

condenser/membrane/compressor/membrane/condenser; and condenser/membrane/condenser/membrane.

The operation of the membrane unit can be improved by using sweeping streams. As the sweeping gas it is possible to use nitrogen, polymerization diluents, and/or (pure) monomers or comonomers. When, for example, there is propane on one side of a hydrogen-selective membrane, the partial pressure of hydrogen drops and the amount of hydrogen separating in the unit increases. It is possible to combine the gas, stream from the product separation of the fluidized-bed reactor with the first gas stream (i.e. the circulation gas stream of the reactor). This sixth gas stream is obtained from the separation tank where the reactor effluent is divided into a product stream, which contains the polymer, and a sixth gas stream, which contains gaseous compounds.

The solution according to the present invention can be applied, for example, to grade change in a gas-phase reactor.

In general, in grade change the procedure can be that a gas stream is separated from the exit stream of a gas-phase reactor at a pressure substantially lower than the pressure in the gas-phase reactor. The gas stream is directed to membrane separation. Preferably hydrogen is removed in this case mainly from the circulation gas of the gas-phase reactor or from the recovery stream of the product separator. The pressure of the feed gas of the membrane unit may, when necessary, be increased if this proves to be economically profitable. The need for pressure increase is dependent both on the selectivity and the permeability of the membrane film, and on the mutual economy of the pressure increase and the membrane surface area.

In grade change the membrane system is advantageously combined with the circulation gas cooling stream; the membrane system is preferably placed at a point after the circulation-gas blower, before the circulation-gas condenser. Thereby the advantage is gained that in the membrane apparatus the lightest portion is removed from the gas stream, and thus the cooling of the remaining (most of the gas stream) stream is facilitated. At the same time the advantage is gained that with the exiting gas the hydrogen content of the circulation gas is decreased and the grade change is sped up. Usually a part of the circulation gas is fed into the membrane system.

Most preferably the gas may be removed from the recovery stream, in which case the product coming from the gas-phase reactor is directed, after a lowering of the pressure, to a product separator. From the separator the uncondensed gases are directed to a recovery compressor. In terms of the invention it is essential in this case that the product separator is operated under a pressure considerably lower than the gas-phase reactor. The lowering of the pressure results in that it is possible to separate from the product a maximal amount of light gases, which are directed to the recovery compressor. If the product separator operates under substantially the same pressure as the gas-phase reactor, the quantity of light components traveling along with the product, polymer is large. In this case they must be separated from the product later. It is important for the entire polyolefin process that the product can be purified well, which is possible if the product separator is operated under as low a pressure as possible.

Combined with the treatment of the circulation stream, grade change is carried out by cooling the circulation gas stream at a point after the blowers but before the membrane separation, in which case only the uncondensed portion of the circulation stream is directed to membrane separation. By combining the membrane separator with the cooling cycle it is possible to concentrate in the gas stream the components to be separated, and thus grade change can be sped up by using quite small a membrane surface area. The gases can be directed to the gas phase reactor either with the liquid or as a separate stream, or they may be directed for further treatment (e.g. distillation).

As was pointed out above, membrane separation can also be used for the separation of hydrogen and other light components from the fluid between two reactors. The reaction product which comes from a liquid-phase reactor, or from a reactor in which supercritical conditions prevail, typically comprises a medium having a monomer and comonomer concentration above 60%. The reaction medium possibly also contains an inert hydrocarbon (diluent), which usually vaporizes when the pressure is lowered. Hydrogen used for the control of the molar mass is released from the reaction product in the product separator.

Corresponding gaseous compounds are obtained from the product separators of gas-phase and liquid-phase reactors.

The procedure according to the invention is that from the effluent, i.e. the exit stream, of the first reactor/reactor system there is separated by vaporization the portion which contains unreacted light hydrocarbons and hydrogen. From the exit stream, or more precisely from its fluid portion, there is preferably separated approx. 0.1–90%, advantageously approx. 5–50%, most preferably approx. 10–40% of the volatile compounds present in it. All compounds except the polymerization or copolymerization product are deemed to be volatiles. From the reject it is possible to separate portions which contain light hydrocarbons and hydrogen several times between the reactors. According to one preferred embodiment, the hydrocarbon effluent from the first separator is directed to a second separator, wherein there is again separated from it a portion, which is directed to a membrane separator. The hydrocarbon effluent from the second separator can be fed into the reactor or it can be directed to a third separator. In each separator it is possible to separate from the hydrocarbons approx. 5–30%, and thus in total approx. 15–90% of the effluent of the first reactor has been treated in a membrane separator before being fed into the second reactor.

According to one embodiment of the present invention, 0.1–50% by weight, preferably 1–40% by weight, of the fluid portion of the effluent is vaporized.

According to one embodiment of the present invention, the pressure of the vaporized portion is raised, in a compressor before the membrane separation.

The said fluid portion of the effluent contains the gaseous and liquid substances, such as unpolymerized monomer, hydrogen and possibly comonomer and diluent.

For separating the gaseous fraction from the effluent of the first reactor or reactor system it is possible to use as the separator a cyclone or a so-called flash tank. If the preceding reactor is a bulk reactor, a portion of the volatile components present in the exit stream is vaporized either by lowering the pressure of the effluent or by raising its temperature. In this case the pressure is lowered in the flash tank preferably by approx. 5–90%, most preferably by approx. 20–70%. The pressure level in the separation tan k, of course, varies according to the pressure in the preceding reactor. If the pressure is lowered significantly (e.g. by 10–60%), the temperature can either be raised or even be lowered by approx. 1–40° C., preferably by approx. 5–20° C. If the separator is preceded by a gas-phase reactor, the vapour fraction is separated from its effluent most preferably by condensing a portion of the hydrocarbons in a condenser. The temperature of the effluent is in this case lowered by, for example, approx. 1–50° C., preferably by approx. 10–40° C.

In the second separator and the separators subsequent thereto, a portion of the hydrocarbons is separated by vaporizing the liquid hydrocarbon effluent from the preceding separator fed into it. Typically the temperature is raised by approx. 1–20° C. and/or the pressure is lowered by approx. 5–20%.

The vaporous stream obtained from each separator is directed to a membrane system, whereby it can be divided into a hydrogen-containing hydrocarbon stream and one or more hydrocarbon streams from which a substantial proportion of the hydrogen has been removed. The uncondensed gases are directed to the membrane unit preferably via a heater. Heating is carried out in particular in the case of polymer-based hydrogen-selective membranes in order that there should not occur condensing at the membrane unit. In order to make the separation more effective, the pressure of the gas stream directed to a membrane may be increased, for example in a compressor, before membrane separation.

According to one embodiment of the present invention, the solids are separated before the membrane separation.

According to the invention, there may be a plurality of membrane separator modules in one and the same membrane separation unit. These modules may be arranged in parallel and/or in series. Each membrane separator unit has preferably 2–30 membrane separator modules.

Hydrogen-selective and hydrocarbon-selective membrane units can be combined together according to the process needs. One preferred embodiment comprises an option which has a plurality of membrane separator units arranged in series, hydrocarbon-selective membrane separation being carried out in the first and hydrogen-selective membrane separation in the second.

The operation of a membrane unit, in particular the separation of hydrogen, can be improved by means of sweeping streams. The sweeping gas used is, for example, nitrogen, polymerization diluent and/or monomer and/or comonomer. The retentate/permeate of some other membrane unit is also usable. When there is an inert hydrocarbon, such as propane, on one side of a hydrogen-selective membrane, the partial pressure of hydrogen decreases and the amount of hydrogen to be separated increases.

The separated hydrogen can further be directed for reuse to other process units where it is needed or, in an extreme case, be burned in the flare. According to one embodiment of the present invention, the separated hydrogen is recycled to polyolefin production. When most of the hydrogen has been removed, the hydrocarbon-containing stream can be condensed at least in part and be returned to the reactor cycle.

Membrane separator units are typically operated at a temperature of 20–90° C. and under a pressure of 0.5–5 MPa. However, these values do not represent any absolute limits to the process according to the invention.

The membranes used in the separation of gases can be classified into inorganic membranes, carbon fiber membranes, polymer membranes and liquid membranes. All of these types can be used in the present invention. Ceramic membranes can be mentioned as an example of inorganic membranes. Polymer membranes constitute an especially advantageous option.

The operation of the liquid membranes used in the invention is based on the different rates of dissolution, in the liquid membrane concerned, of the substances to be separated. The stability of the liquid in the membrane is a problem, as is its relatively low permeability, which leads to a large mass transfer surface area required and thereby a high price.

In practice the polymer membranes used can be further divided into two categories according to whether the polymer is in a rubbery or a glassy state. By rubbery polymers are meant here amorphous polymers, which are used at temperatures above their softening or glass transition temperatures. The mechanical properties of rubbery polymers can be improved by combining polymers, such as styrene-butadiene-styrene (SBS) or silicone-polycarbonate. Especially well suited for the separation of hydrogen and light hydrocarbons is silicone rubber, i.e. poly(dimethylsiloxane), PDMS; selectivity and permeability values of membranes made ;om it have been presented in the literature. The mechanical properties of the polymer can be improved by preparing from the material copolymers, e.g. siloxane-polyimide segment polymers.

Polyacetylene membranes are usually classified as glassy materials, and of them it is possible to use, for example, poly(1-(triethylsilyl)-1-propene), PTMSP, for which selectivitly and permeability values have also been presented in the literature. This membrane can also be used for preparing substituted polyacetylene membranes, for example, PtB poly(t-butylacetylene) and PFM poly(o-(trifluoromethyl) phenylacetylene). One further option is to use membranes made from polyvinyltrimethylsilane, PVTMS.

Polyimides are glassy membranes which have good mechanical properties and heat resistance. Polyimides which can be used in the present invention include PMDA, BPDA, BTDA, 6FDA, pp'-ODA, mp'-ODA, APAP, BAHF, BAPHF and BATPHF (acronyms and properties: Tanaka et. al. Permeability and permselectivity of gases in flourinated and non-flourinated polyimides, Polymer, 33 (1992), 3). The polyimides mentioned above can be used for preparing numerous substituents which are, according to their properties, usable in the process defined by the present invention.

Polyamides are also used commonly for the separation of light gases. For example, the following materials can be used in the present invention: IP/6F, TBI/SO$_2$, TBI/6F, PII/SO$_2$ and IP/SO$_2$ (acronyms and properties: Morisato et. al, Gas separation properties of aromatic polyarnides containing hexafluoroisopropylidene groups, Journal of Membrane Science, 97 (1994)).

Other glassy membrane materials include; polyphenyloxide, bisphenol A polysulfone (PSF), tetramethylbisphenol A polysulfone (TMPSF), polyearbonates [bisphenol A polycarbonate (PC), tetramethylbisphenol A polycarbonate (TMPC), hexafluorobisphenol A polycarbonate (HFPC) and tetramethylhexafluorobisphenol A polycarbonate (TMHF-PC)], various grades of polyethylene, cellulose acetate, and copolymers of polytetrafluoroethylene and Teflon AF 2400.

The operation of the membrane system varies according to the material from which it is made. The operation of hydrocarbon-selective and respectively hydrogen-selective membrane units is depicted in FIGS. 1 and 2.

Figure 1:
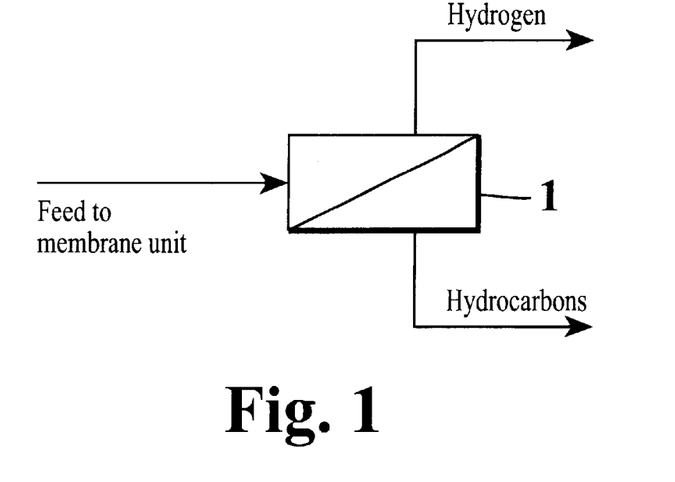
FIGS. 1 and 2 depict the principles of a hydracarbon-selective and, respectively, a hydrogen-selective membrane system.
Figure 2:
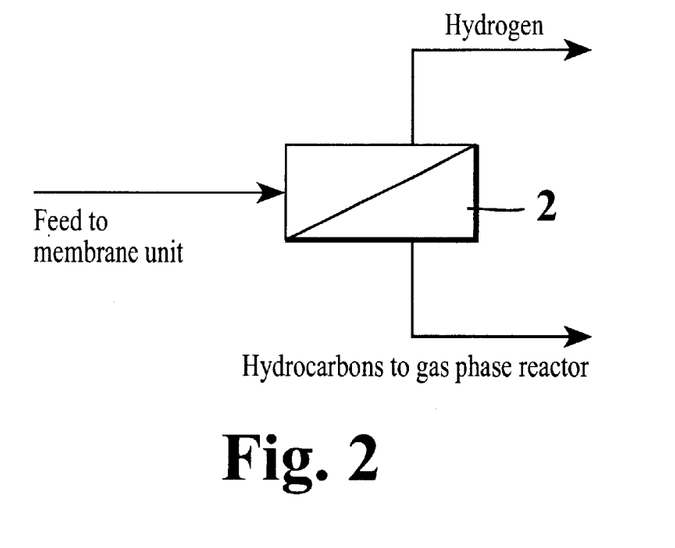

FIG. 1 depicts a system which uses silicone rubber and which functions so that the hydrocarbons in the feed of the membrane w:it permeate more rapidly through the membrane 1 and hydrogen is concentrated in the reject stream (i.e. the portion which does not pass through the membrane). In this case the membrane is hydrocarbon-selective. When other materials are used (see FIG. 2), hydrogen concentrates in the permeate stream (i.e. the portion which has passed through the membrane), i.e. the membrane 2 is hydrogen-selective.

In the system according to the invention, hydrogen and the lightest hydrocarbons are removed from the gas mixture emerging from a gas-phase reactor. The quantity of hydrocarbons is considerably higher than that of hydrogen. Thus it is advantageous to use a membrane system based on a hydrogen-selective membrane material or combinations which have both hydrogen-selective and hydrocarbon-selective membranes.

The use of polyamide, polysulfone and polyimide membranes is especially advantageous, since their selectivity with respect to hydrogen is known to be good, and additionally their mechanical properties enable an advantageous membrane system to be made for this application.

Membrane systems are usually made up of a plurality of membrane modules. At the manufacturing stage usually either an even sheet or hollow fibers are formed from the membrane material, and these are packed into different module structures to provide a large mass transfer surface area. A module is a small and independent building block of the membrane system, and it includes one or more membrane elements and the flow spaces surrounding them. The membrane modules generally the most suitable for the present application and the separation of gases are hollow-fiber and spiral modules. The sheet-like membranes used in spiral modules have in general a higher permeability than hollow-fiber membranes made from the same material, since it is difficult to make a fibrous structure as thin as a sheet-like structure. The advantage of hollow-fiber modules is their clearly lower manufacturing cost.

Commercial membrane systems and their modules are described in, for example, Handbook of Separation Process Technology (Ronald W. Rousseau Ed., Wiley-Interscience, John Wiley & Sons, New York 1987, 866–869).

Process configurations of preferred embodiments of the invention are illustrated in accompanying FIGS. 3–6.

Figure 3:
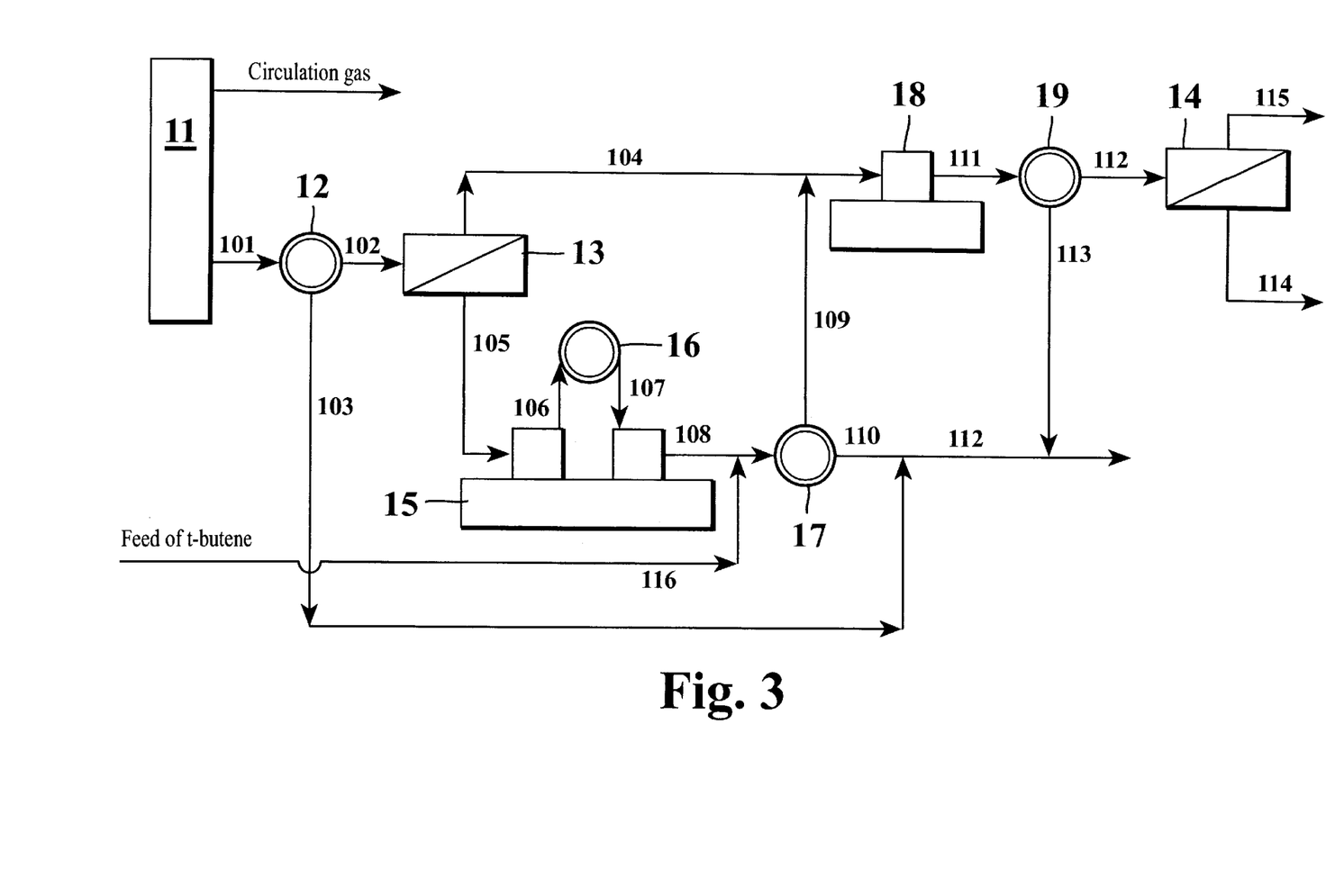
FIG. 3 depicts a process flow diagram for the first preferred embodiment of the invention, wherein the uncondensed portion of the circulation gas stream is treated using two membranes arranged in series.

In the case according to FIG. 3, there is withdrawn from a gas-phase reactor 11 a conventional circulation gas stream the amount of which is 1–50% smaller than that of a normal circulation gas stream. Alongside the circulation gas stream there is withdrawn from the reactor a second gas stream 101 which is directed to a condenser 12, where it is cooled in order to condense the condensable compounds. There is obtained a gas stream 102 which contains hydrogen and light hydrocarbons, and a stream 103 which contains condensed compounds and is returned to, the reactor. The gas stream 102 is directed to a membrane 13. The first membrane used is a hydrogen-selective membrane, which is, for example, of the silicone rubber type. Hydrogen and the lightest hydrocarbons concentrate in the retentate stream 105 of the membrane and are directed to a second membrane system 14. The permeate is directed to a two-stage compressor 15, where its pressure is raised from 280 kPa to 2850 kPa. Between the compressor stages the gas is cooled 16.

After the raising of the pressure the gas stream is cooled in a condenser 17, from which the uncondensed components are directed, together with the retentate of the first membrane, to a second compressor 18, where the pressure of the combined gas stream is raised from 2800 kPa to 3950 kPa. The product of the second compressor is cooled 19, and the condensed components are directed, together with the components condensed in the first and the third condensers 12, 17, in a liquid phase back to the gas-phase reactor 11.

From the second condenser 19 the uncondensed gases are directed to the second membrane system 14, where a hydrogen-containing permeate and an almost hydrogen-free retentate are separated using a hydrogen-selective membrane. The permeate may, for example, be recycled to the preceding reactor. The retentate may be directed to the recovery of light components, as distillation column feed.

The 1-butene used as a diluent can be fed directly into the gas-phase reactor 11. This is what is also done in Example 1 below. FIG. 3 shows an alternative point for feeding in 1-butene, namely the condenser 17. The said option promotes the condensation of the stream taken from the gas phase. In Example 2 presented below, the advantage provided by the process is exploited by increasing the production capacity by increasing the partial pressure of ethylene in the gas-phase reactor.

The most significant advantage of the embodiment depicted in FIG. 3 is that by the method energy is removed from the gas-phase reactor in a manner which enables the capacity to be increased without enlarging the reactor.

The process can be used for separating the hydrogen for recycling it to the loop reactor. The process can be used for preparing a stream (No. 114) which is directed to the recovery system for light gases and which at the same time serves as a removal system for the inert components entering the gas-phase reactor and produced therein.

Figure 4:
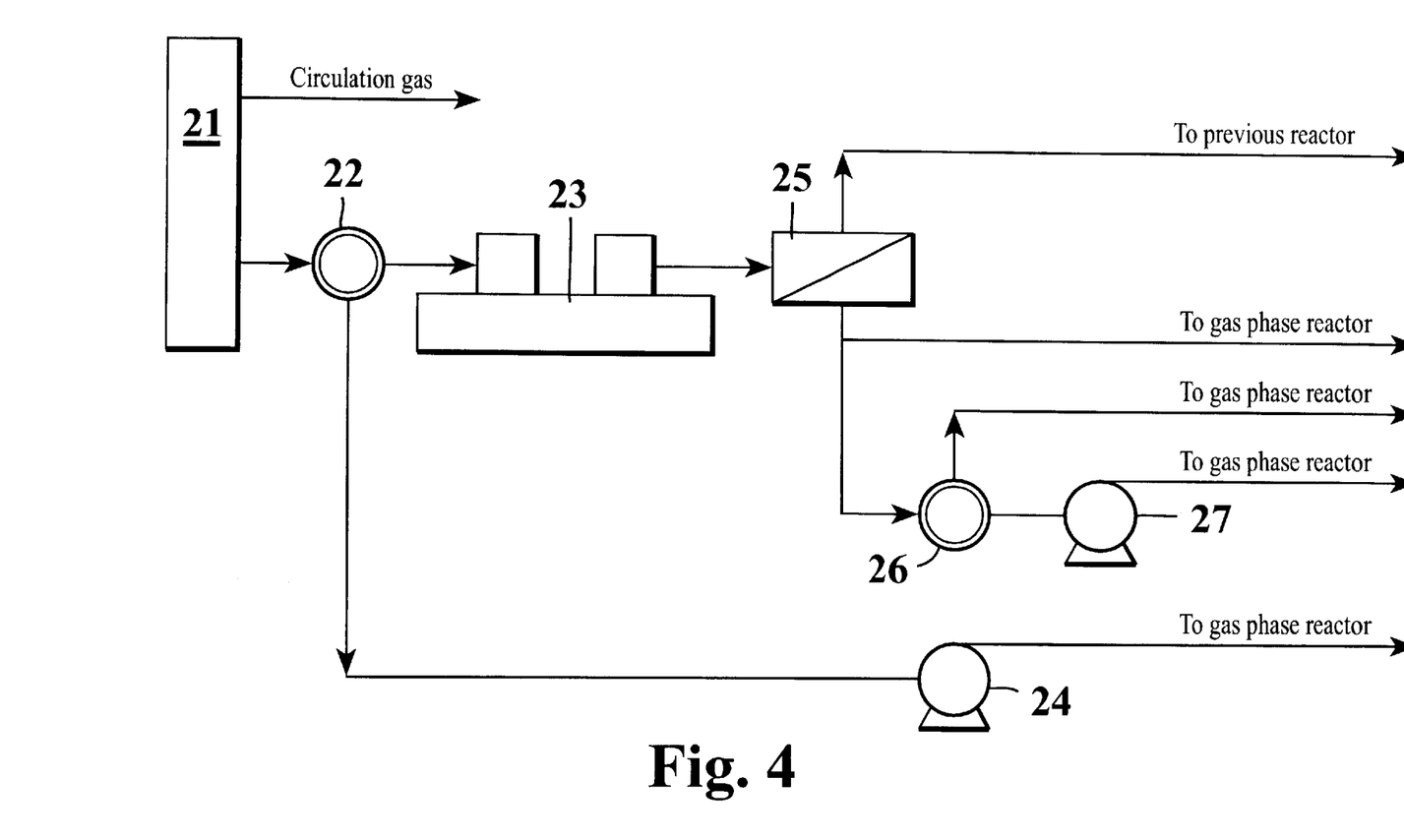
FIG. 4 depicts a simplified process flow diagram of an option in which the condensed liquid is returned as a separate stream to the gas-phase reactor.

In the case according to FIG. 4 the invention has been implemented using slightly simpler means than in the preceding examples.

From a gas-phase reactor 21 a stream is taken via a condenser 22 to a compressor 23, as before, but the condensed liquid is returned via a pump 24 as a separate stream to the gas-phase reactor. The uncondensed portion is compressed and fed into a membrane system 25. The membrane system is based on the use of a hydrocarbon-selective film (e.g. silicone rubber). Hydrogen is concentrated in the retentate, but the retentate also contains a large amount of hydrocarbons. It is directed to a loop reactor. The permeate which has passed through the membrane is directed either directly to the gas-phase reactor and is combined with the circulation gas stream of the gas-phase reactor or is directed together with it to the gas-phase reactor.

It is possible that a portion or all of the permeate is directed via a condenser 26 to a pump 27, from where it is further pumped to the gas-phase reactor in accordance with what is stated above. Those gases which do not condense in the condenser can be directed, for example, to the distillation unit for light gases.

Figure 5:
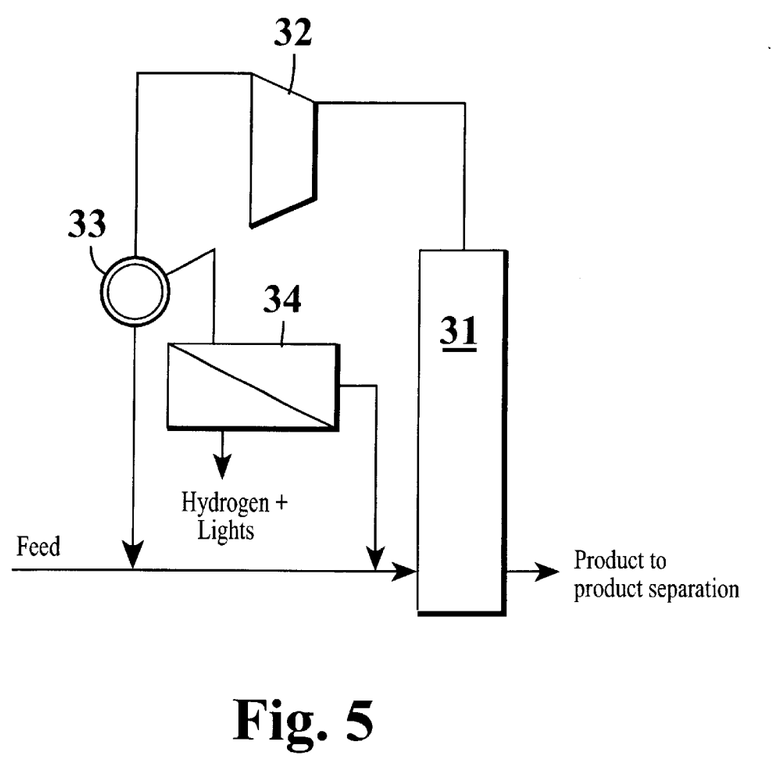
FIG. 5 depicts a diagram of the principle of an apparatus configuration suitable for grade change, in which configuration a condenser and a membrane separator have been added to the circulation gas stream, in which case the stream is divided into an uncondensed stream which is directed to the membrane separator and a condensed stream which is at least in part returned to the gas-phase reactor.

FIG. 5 depicts an embodiment relating in particular to grade change in a gas-phase reactor 31. A membrane system 34 has been placed in the circulation-gas stream at a point after a blower 32 and a condenser 33. The placing of the membrane system in the manner according to FIG. 5 in the cooling cycle of the gas-phase reactor 31, makes it possible to separate the accumulating components from the cycle. At the same time the efficiency of the membrane separation is increased, since the components to be separated are concentrated in the uncondensed portion obtained from the condenser. Preferably the membrane separator is operated at a temperature approx. 5–45° C. higher than the condensation temperature of the condenser. When necessary, a filter or the like may be mounted between the condenser 33 and the membrane separator 34 in order to remove solids from the gas stream.

The hydrocarbon product of the membrane separator may be recycled to the reactor 31, but the process depicted in FIG. 5 may also be implemented as a two-stage process so that after the membrane separator 34 there is arranged a condenser and a second membrane separator, by means of which a portion of the off-gas of the first separator is condensed.

Figure 6:
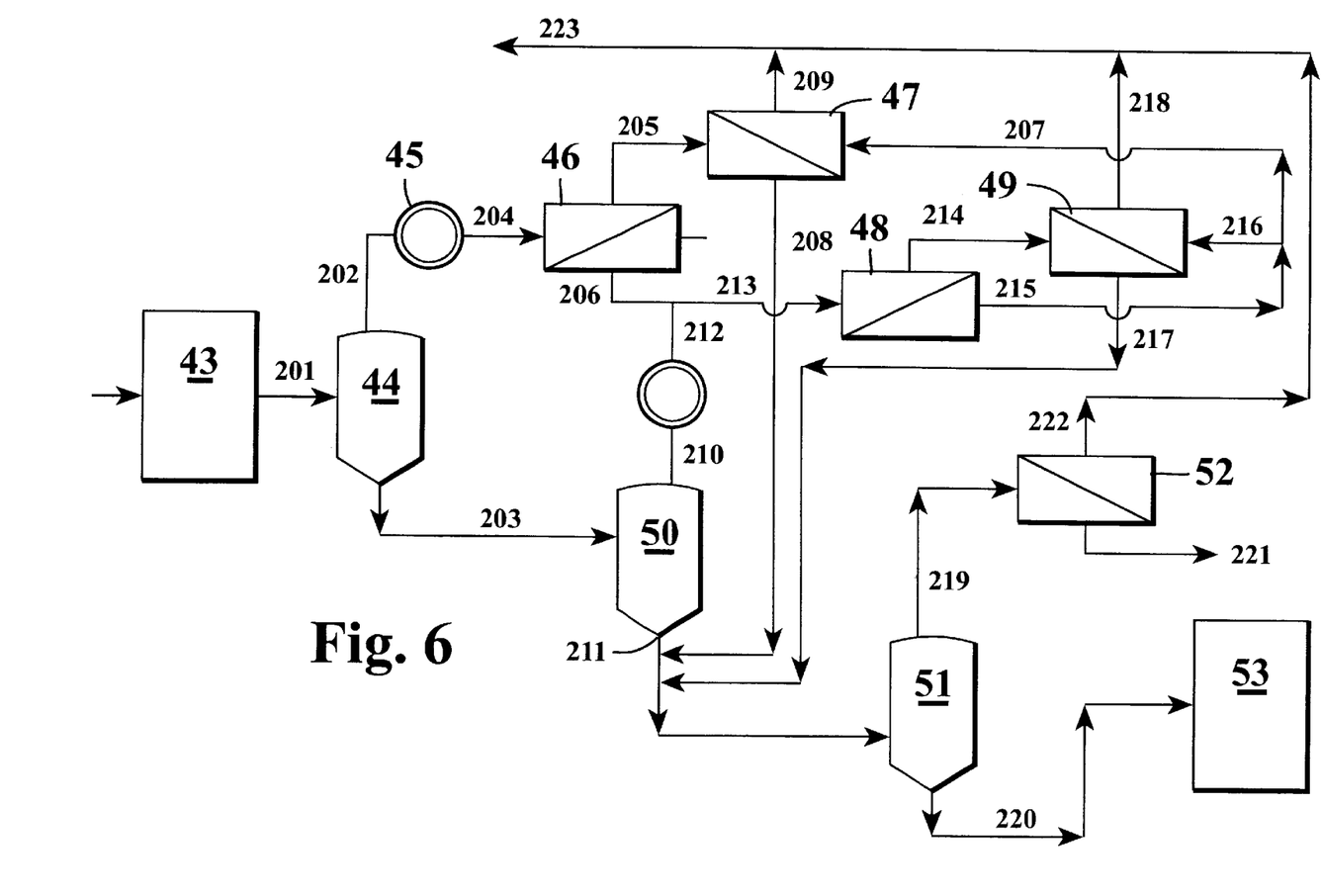
FIG. 6 depicts a diagram of a process according to the invention, wherein the membrane separation is arranged between the first polymerization reactor of the reactor system and the gas-phase reactor.

In the case according to FIG. 6, the polymer-containing product stream of a reactor 43 operating in supercritical conditions (in this case a loop reactor) is directed to a product separator 44, from which the gases are directed via filtration to a first membrane system 46. The separator membrane is a hydrocarbon-selective membrane, for example of the silicon rubber type. When necessary, a heater 45 may be arranged at a point before the membranes to ensure that the permeate of the membrane system is not condensed. Condensation is possible, since the heaviest hydrocarbons present in the feed are concentrated in the permeate stream 206, and thus the boiling point of the permeate is higher than that of the feed. Hydrogen and the lightest hydrocarbons concentrate in the retentate stream 205, and they are directed to a second membrane system 47.

In the second membrane system 47, hydrogen is separated from the light hydrocarbons and is recycled to the loop reactor or possibly to the polymerization reactor preceding it (stream 223). The separating membrane is a hydrogen-selective material, typically a polymer. In the example, the permeate stream 215 from a third membrane 48 is directed to the permeate side 207 of the second membrane. Thereby the hydrogen concentration on the permeate side is diluted and the amount of hydrogen going to membrane 47 is increased. Respectively, the permeate of the third membrane system is used as a sweeping gas 216 for the retentate side of a fourth membrane system. The retentate 208 of the second membrane system is directed to a second product separator 50, but it may also be directed to the flare.

The membrane units 46, 47, 48 and 49 may comprise a plurality of so-called modules. The modules may be placed either in series and/or in parallel. Typically there are 5–20 modules. The surface area required for separation depicts the total surface area of the modules required, and a suitable number of modules is selected according to the manufacturer and the membrane type. Usually there are a few spare membranes. For example, 50 membranes are in use at a time and five in reserve so that one battery contains 5 membranes and there are three batteries.

The polymer-containing product from the first product separator 44 is directed to the second product separator 50, from where the gases (stream 210) are directed together with the permeate from the first membrane (stream 206) to the third membrane system 48, the hydrogen-containing permeate 215 of which is directed to the permeate sides of the second and the fourth membrane systems 47, 49. The permeate 215 contains only a little hydrogen, since it is obtained from a hydrocarbon-selective membrane in the permeate of which hydrocarbons are concentrated, while hydrogen is concentrated in the retentate. The permeate can be used as a sweeping gas in other membrane modules (47 and 49). In that case it lowers the partial pressure of hydrogen on the permeate sides of the membranes 47 and 49 and thereby increases the flow of hydrogen through the said membranes. The third membrane system 48 has a hydrocarbon-selective membrane, and the fourth membrane system 49 has a hydrogen-selective membrane through which hydrogen permeates more easily than do light hydrocarbons. The retentate (stream 214) of the third membrane system is directed to the fourth membrane system (49), the permeate of which is a hydrogen-containing stream 218, which is directed back to the loop reactor (stream 223) or possibly to the polymerization reactor preceding it. The retentate from the fourth membrane 217 is directed to the third product separator 51.

The polymer-containing stream 211 exiting from the second product separator 50 is further directed to the third product separator 51, from which the gases are directed to a fifth membrane unit 52, from which there is obtained as the retentate of its hydrocarbon-selective membrane an off-gas 221, which is directed, for example, for fuel gas. The permeate stream 222 contains hydrocarbons (and only a little hydrogen) and thus it can be directed, for example, to the recovery compressor of a gas-phase reactor 53 or be fed back to the loop reactor.

The polymer-containing bottom stream 220 of the third product separator 51 is fed into the gas-phase reactor 53.

The following computational examples illustrate the invention:

EXAMPLES 1 and 2

Polyethylene is prepared using the process configuration according FIG. 3. The membrane material used in the membrane separator 13 is a hydrocarbon-selective membrane of the silicone rubber type. The membrane of the membrane separator 14 is of a polymer material (polyimide).

Tables 1 and 2 depict the compositions of the streams depicted in the figure.

TABLE 1

| Example 1: Normal ethylene concentration in the feed | | | | | | | | |
|---|---|---|---|---|---|---|---|---|
| Stream | 101 | 102 | 103 | 104 | 105 | 106 | 107 | 108 |
| Pressure, kPa | 2050.0 | 2050.0 | 2050.0 | 2050.0 | 205.0 | 660.0 | 640.0 | 2070.0 |
| Temp., ° C. | 75.0 | 44.7 | 44.7 | 42.0 | 42.0 | 87.5 | 60.0 | 110.7 |
| Tot., kg/h | 103365 | 9441.9 | 93923 | 6214.2 | 3227.7 | 3227.7 | 3227.7 | 3227.7 |
| Component flow rate, kg/h | | | | | | | | |
| $H_2$ | 12.4 | 9.1 | 3.4 | 8.3 | 0.710 | 0.710 | 0.710 | 0.710 |
| Ethylene | 8661.7 | 1982.0 | 6679.4 | 1498.3 | 483.7 | 483.7 | 483.7 | 483.7 |
| Ethane | 335.6 | 61.6 | 274.0 | 46.6 | 15.0 | 15.0 | 15.0 | 15.0 |
| Propane | 77520 | 6615.9 | 70904 | 7230.2 | 2385.7 | 2385.7 | 2385.7 | 2385.7 |
| 1-Butene | 2078.8 | 88.6 | 1990.2 | 49.3 | 39.2 | 39.2 | 39.2 | 39.2 |
| n-Butane | 179.5 | 6.7 | 172.8 | 3.7 | 3.0 | 3.0 | 3.0 | 3.0 |
| i-Butane | 14577 | 678.1 | 13899 | 377.7 | 300.4 | 300.4 | 300.4 | 300.4 |
| Stream | 109 | 110 | 111 | 112 | 113 | 114 | 115 | 116 |
| Pressure, kPa | 2050.0 | 2050.0 | 3000.0 | 3000.0 | 3000.0 | 3200.0 | 200.0 | 2900.0 |
| Temp., ° C. | 25.0 | 25.0 | 63.2 | 25.0 | 25.0 | 45.0 | 45.0 | 35.0 |
| Tot., kg/h | 57.9 | 3169.8 | 6272.1 | 460.4 | 5812.3 | 450.7 | 9.7 | 0 |
| Component flow rate, kg/h | | | | | | | | |
| $H_2$ | 0.288 | 0.422 | 8.6 | 5.8 | 2.8 | 1.0 | 4.7 | 0 |
| Ethylene | 23.6 | 460.1 | 1521.9 | 232.4 | 1289.2 | 228.9 | 3.6 | 0 |
| Ethane | 0.540 | 14.5 | 47.1 | 5.5 | 41.6 | 5.5 | 0.035 | 0 |
| Propane | 31.4 | 2354.3 | 4261.6 | 206.2 | 4056.2 | 204.9 | 1.3 | 0 |
| 1-Butene | 0.219 | 39.0 | 49.6 | 1.1 | 48.5 | 1.1 | 3.45E−3 | 0 |
| n-Butane | 0.014 | 3.0 | 3.7 | 0.071 | 3.7 | 0.071 | 2.25E−4 | 0 |
| i-Butane | 1.9 | 298.5 | 379.5 | 9.3 | 370.4 | 9.2 | 0.029 | 0 |

TABLE 2

Example 2: High ethylene concentration in the feed

| Stream | 101 | 102 | 103 | 104 | 105 | 106 | 107 | 108 |
|---|---|---|---|---|---|---|---|---|
| Pressure, kPa | 2880.0 | 2880.0 | 2880.0 | 2880.0 | 288.0 | 1070.0 | 1050.0 | 2880.0 |
| Temp., °C. | 75.0 | 30.0 | 30.0 | 42.0 | 42.0 | 106.9 | 60.0 | 114.4 |
| Tot., kg/h | 100067 | 19575 | 80503 | 13817 | 5758.6 | 5758.6 | 5758.6 | 5758.6 |
| Component flow rate, kg/h | | | | | | | | |
| $H_2$ | 25.2 | 21.8 | 3.3 | 20.1 | 1.8 | 1.8 | 1.8 | 1.8 |
| Ethylene | 35068 | 13189 | 21869 | 9902.3 | 3287.2 | 3287.2 | 3287.2 | 3287.2 |
| Ethane | 6013.8 | 1863.5 | 4149.5 | 1399.1 | 464.4 | 464.4 | 464.4 | 464.4 |
| Propane | 22.0 | 3.3 | 18.8 | 2.1 | 1.2 | 1.2 | 1.2 | 1.2 |
| 1-Butene | 37172 | 2729.0 | 34456 | 1512.9 | 1216.1 | 1216.1 | 1216.1 | 1216.1 |
| n-Butane | 145.3 | 9.3 | 136.0 | 5.2 | 4.2 | 4.2 | 4.2 | 4.2 |
| i-Butane | 21611 | 1758.8 | 19870 | 975.1 | 783.7 | 783.7 | 783.7 | 783.7 |
| Stream | 109 | 110 | 111 | 112 | 113 | 114 | 115 | 116 |
| Pressure, kPa | 2880.0 | 2880.0 | 4500.0 | 4450.0 | 4450.0 | 4450.0 | 200.3 | 2900.0 |
| Temp., °C. | 25.0 | 25.0 | 67.6 | 25.0 | 25.0 | 45.0 | 45.0 | 35.0 |
| Tot., kg/h | 3176.0 | 3301.4 | 16993 | 12970 | 4022.3 | 12513 | 456.6 | 720.0 |
| Component flow rate, kg/h | | | | | | | | |
| $H_2$ | 1.7 | 0.065 | 21.8 | 21.0 | 0.757 | 1.9 | 19.1 | 0 |
| Ethylene | 2274.0 | 1014.3. | 12176 | 16028 | 2148.1 | 9626.4 | 401.9 | 0 |
| Ethane | 289.7 | 174.8 | 1688.8 | 1332.8 | 356.0 | 1310.6 | 22.2 | 0 |
| Propane | 0.465 | 0.736 | 2.6 | 1.7 | 0.898 | 1.6 | 0.028 | 0 |
| 1-Butene | 422.3 | 1512.1 | 1935.2 | 975.1 | 959.7 | 966.9 | 82 | 720.0 |
| n-Butane | 0.809 | 3.3 | 6.0 | 2.9 | 3.1 | 2.8 | 0.024 | 0 |
| i-Butane | 187.0 | 596.1 | 1162.0 | 608.2 | 553.7 | 603.1 | 5.1 | 0 |

As can be seen from the table, the capacity of the reactor can be increased by the process according to the invention. At the same time, the examples show that the 1-butene used as the comonomer and the n-butane and iso-butane used as diluents can be fed into the condensers shown in the examples. Thereby the operation of the system is promoted by condensing as large as possible a portion of the stream (No. 101) withdrawn from the gas-phase reactor.

EXAMPLE 3

The efficiency of a membrane separator fitted in the cooling cycle of a gas-phase reactor is examined below by comparing it in two different cases to grade change without condensation and with partial condensation. The object was in both cases to halve the amount of hydrogen.

In the first case, run 2, case 4 of WO application publication 94/25495 was repeated.

The conditions were as follows:

| Reactor | |
|---|---|
| pressure | 2.17 bar |
| temperature | 98° C. |
| feed temperature | 29.4° C. |
| gas amount | 10 t |
| gas flow | 25600 m³/h |
| Membrane unit | 1750 m² |
| feed | 3000 kg/h |
| permeate pressure | 300 kPa |

TABLE 3

| | Initial situation | | Partial condensation/29.4° C. Duration 132 min | Without condensation Duration |
|---|---|---|---|---|
| | | | Final | 300 min |
| Composition | mol-% | Uncondensed gas, mol-% | situation, mol-% | Final situation, mol-% |
| $H_2$ | 17.7 | 21.2 | 8.7 | 8.8 |
| $CH_4$ | 1 | 1.2 | 1 | 1 |
| $C_2H_4$ | 40.5 | 45.1 | 40.5 | 40.5 |
| $C_2H_6$ | 8.5 | 9.2 | 8.5 | 8.5 |
| $1-C_4H_8$ | 0 | 0 | 0 | 0 |
| $i-C_5H_{12}$ | 3.7 | 1.2 | 4.7 | 3.7 |
| $1-C6H_{12}$ | 0.6 | 0.1 | 0.8 | 0.6 |
| $n-C_6H_{14}$ | 10 | 1.0 | 13.7 | 9.9 |
| $n-C_8H_{18}$ | 0.5 | 0.0 | 0.6 | 0.4 |
| $N_2$ | 17.6 | 21.0 | 21.5 | 26.7 |
| | 100 | 100 | 100 | 100 |
| Density, kg/m³ | 23.4 | | 27.9 | 25.1 |
| Total permeate, kg | | | 154 | 298 |
| Ethylene loss in permeate, kg | | | 86 kg | 163 kg |

TABLE 4

| | Initial situation | | Partial condensation/36.4° C. Duration 144 min | Without condensation Duration |
|---|---|---|---|---|
| | | | Final | 272 min |
| Composition | mol-% | Uncondensed gas, mol-% | situation, mol-% | Final situation, mol-% |
| $H_2$ | 12.5 | 15.3 | 6.2 | 6.2 |
| $CH_4$ | 0 | 0 | 0 | 0 |

TABLE 4-continued

| | Initial situation | Partial condensation/36.4° C. Duration 144 min | | Without condensation Duration |
|---|---|---|---|---|
| Composition | mol-% | Uncondensed gas, mol-% | Final situation, mol-% | Final situation, mol-% |
| | | | | 272 min |
| $C_2H_4$ | 29.1 | 32.7 | 29.1 | 29.1 |
| $C_2H_6$ | 16.4 | 9.2 | 8.5 | 8.5 |
| $1\text{-}C_4H_8$ | 0 | 0 | 0 | 0 |
| $i\text{-}C_5H_{12}$ | 13.3 | 4.6 | 14.3 | 13.1 |
| $1\text{-}C_6H_{12}$ | 0 | 0 | 0 | 0 |
| $n\text{-}C_6H_{14}$ | 0 | 0 | 0 | 0 |
| $n\text{-}C_8H_{18}$ | 4.3 | 0.8 | 4.8 | 4.2 |
| $N_2$ | 24.4 | 30.0 | 29.2 | 31.0 |
| | 100 | 100 | 100 | 100 |
| Density, kg/m³ | 29.0 | | 30.8 | 29.6 |
| Total permeate, kg | | | 186 | 334 |
| Ethylene loss in permeate, kg | | | 99 kg | 159 kg |

In the second case, Example 9 of WO application publication 94/28032 was repeated.

The conditions were as follows:

| Reactor | |
|---|---|
| pressure | 24 bar |
| temperature | 103° C. |
| feed temperature | 36.4° C. |
| gas amount | 10 t |
| gas flow | 20700 m³/h |
| Membrane unit | 2500 m² |
| feed | 3000 kg/h |
| permeate pressure | 300 kPa |

As is evident from the foregoing examples, by the use of membrane separators it is possible to speed up considerably grade change in a gas-phase reactor equipped with a cooling cycle and to reduce ethylene loss.

The examples also show that feeding the gas stream directly, without partial condensation, into the membrane unit is not advantageous, since in that case the stream fed into the unit has the same composition as has the stream exiting from the gas-phase reactor. When partial condensation is used, the stream fed into the membrane system is considerably lighter, i.e. a stream from which the heaviest compounds have been removed. With this procedure, for example, the concentration of hydrogen in the membrane unit feed is higher, and this makes a more rapid removal of hydrogen possible.

However, by each method hydrogen can be removed well as compared with removal carried out without a membrane. In the last-mentioned case the halving of hydrogen without condensation would require the removal of one half of the amount of the gas-phase reactor+circulation. If, for example, the inventory is 10 t, this would require 5 t of purge. When membranes are used, there will not be more than a few hundred kg.

The gas stream obtained from partial condensation has a composition different from that of the circulation gas stream. A large proportion of $C_5$ and heavier hydrocarbons have been removed from it. This is significant when a. membrane unit is used, but without membrane separation, partial condensation does not improve the situation substantially. This is due to the fact that in the gas coming from partial condensation the hydrogen to ethylene concentration ratio remains mainly unchanged even if a purge stream is withdrawn from the gas. Thus almost the same amount of ethylene is removed with hydrogen from the system as in a case in which partial condensation is not used.

EXAMPLE 5

Polyethylene is produced by using the process configuration according to FIG. 6. The membrane material used in membrane separator systems 46, 48 and 52 is a hydrocarbon-selective membrane of the silicone rubber type. The membranes in the membrane separators 47 and 49 are polyimides.

Table 5 shows the compositions of the streams shown in the figure.

TABLE 5

| Stream | 201 | 202 | 203 | 204 | 205 | 206 | 207 | 208 | 209 |
|---|---|---|---|---|---|---|---|---|---|
| Pressure, kPa | 6600.0 | 3200.0 | 3200.0 | 3000.0 | 3000.0 | 2600.0 | 1000.0 | 3000.0 | 400.0 |
| Temperature, ° C. | 85.0 | 62.5 | 62.5 | 80.0 | 80.0 | 80.0 | 80.0 | 80.0 | 80.0 |
| Totat kg/h | 10982 | 2239.7 | 8742.3 | 2239.7 | 2068.4 | 171.3 | 642.6 | 2035.0 | 675.9 |
| Component mass flows | | | | | | | | | |
| H2 | 21.5 | 17.3 | 4.2 | 17.3 | 16.4 | 0.851 | 0.194 | 0.220 | 16.4 |
| CH4 | 0.035 | 0.020 | 0.015 | 0.020 | 0.019 | 1.11E−03 | 7.07E−04 | 0.017 | 2.17E−3 |
| Ethylene | 515.0 | 198.3 | 316.7 | 198.3 | 184.4 | 13.9 | 23.3 | 180.7 | 27.0 |
| Ethane | 6.6 | 2.2 | 4.4 | 2.2 | 2.1 | 0.145 | 0.227 | 2.0 | 0.243 |
| Propane | 9744.7 | 1941.1 | 7803.6 | 1941.1 | 1790.9 | 150.2 | 589.4 | 1777.7 | 602.6 |
| 1-Butene | 463.5 | 56.3 | 407.2 | 56.3 | 52.0 | 4.3 | 20.4 | 51.8 | 20.6 |
| Isobutene | 38.2 | 4.7 | 33.5 | 4.7 | 4.3 | 0.361 | 1.7 | 4.3 | 1.7 |
| c-2-Butene | 19.9 | 2.1 | 17.8 | 2.1 | 1.9 | 0.162 | 0.800 | 1.9 | 0.807 |
| t-2-Butene | 23.6 | 2.6 | 21.0 | 2.6 | 2.4 | 0.199 | 0.969 | 2.4 | 0.977 |
| n-Butane | 38.3 | 4.2 | 34.1 | 4.2 | 3.9 | 0.325 | 1.6 | 3.9 | 1.6 |
| i-Butane | 79.5 | 10.3 | 69.2 | 10.3 | 9.5 | 0.789 | 3.6 | 9.4 | 3.7 |
| n-Hexane | 9.6 | 0.302 | 9.3 | 0.302 | 0.277 | 0.024 | 0.217 | 0.276 | 0.218 |
| n-Octane | 21.4 | 0.187 | 21.2 | 0.187 | 0.172 | 0.015 | 0.159 | 0.172 | 0.159 |
| N2 | 0.225 | 0.163 | 0.063 | 0.163 | 0.157 | 5.58E−03 | 1.26E−3 | 0.130 | 0.028 |
| Stream | 210 | 211 | 212 | 213 | 214 | 215 | 216 | 217 | 218 |
| Pressure, kPa | 2800.0 | 2800.0 | 2600.0 | 2600.0 | 2600.0 | 1000.0 | 1000.0 | 2600.0 | 400.0 |
| Temperature, ° C. | 69.0 | 69.0 | 80.0 | 80.0 | 80.0 | 80.0 | 80.0 | 80.0 | 80.0 |
| Totat kg/h | 3263.5 | 5478.8 | 3263.5 | 3434.8 | 2149.6 | 1285.2 | 642.6 | 2130.7 | 661.5 |

TABLE 5-continued

Component mass flows

| | | | | | | | | | |
|---|---|---|---|---|---|---|---|---|---|
| H2 | 3.7 | 0.479 | 3.7 | 4.6 | 4.2 | 0.388 | 0.194 | 0.192 | 4.2 |
| CH4 | 0.011 | 3.95E–03 | 0.011 | 0.012 | 0.011 | 1.41E–03 | 7.07E–04 | 9.92E–03 | 1.44E–03 |
| Ethylene | 184.7 | 132.0 | 184.7 | 198.6 | 151.9 | 46.7 | 23.3 | 149.3 | 25.9 |
| Ethane | 2.3 | 2.1 | 2.3 | 2.5 | 2.0 | 0.454 | 0.227 | 2.0 | 0.241 |
| Propane | 2921.2 | 4882.4 | 2921.2 | 3071.3 | 1892.6 | 1178.8 | 589.4 | 1880.6 | 601.4 |
| 1-Butene | 105.4 | 301.9 | 105.4 | 109.7 | 68.9 | 40.8 | 20.4 | 68.7 | 20.6 |
| Isobutene | 8.7 | 24.8 | 8.7 | 9.1 | 5.7 | 3.4 | 1.7 | 5.7 | 1.7 |
| c-2-Butene | 4.1 | 13.7 | 4.1 | 4.3 | 2.7 | 1.6 | 0.800 | 2.7 | 0.809 |
| t-2-Butene | 5.0 | 16.0 | 5.0 | 5.2 | 3.3 | 1.9 | 0.969 | 3.3 | 0.979 |
| n-Butane | 8.2 | 25.9 | 8.2 | 8.5 | 5.3 | 3.2 | 1.6 | 5.3 | 1.6 |
| i-Butane | 18.7 | 50.5 | 18.7 | 19.5 | 12.3 | 7.3 | 3.6 | 12.2 | 3.7 |
| n-Hexane | 0.784 | 8.5 | 0.784 | 0.809 | 0.375 | 0.434 | 0.217 | 0.374 | 0.218 |
| n-Octane | 0.577 | 20.6 | 0.577 | 0.592 | 0.274 | 0.318 | 0.159 | 0.274 | 0.160 |
| N2 | 0.053 | 0.010 | 0.053 | 0.058 | 0.056 | 2.52E–03 | 1.26E–03 | 0.047 | 9.74E–03 |

| Stream | 219 | 220 | 221 | 222 | 223 |
|---|---|---|---|---|---|
| Pressure, kPa | 2400.0 | 2400.0 | 2200.0 | 400.0 | 400.0 |
| Temperature, °C. | 58.0 | 58.0 | 80.0 | 80.0 | 50.0 |
| Total kg/h | 1076.9 | 8567.7 | 171.4 | 905.5 | 2243.0 |
| Component mass flows | | | | | |
| H2 | 0.633 | 0.258 | 0.446 | 0.187 | 20.8 |
| CH4 | 0.013 | 0.018 | 7.96E–03 | 5.06E–03 | 8.67E–03 |
| Ethylene | 113.6 | 348.5 | 39.2 | 74.5 | 127.4 |
| Ethane | 1.2 | 4.9 | 0.561 | 0.687 | 1.2 |
| Propane | 924.5 | 7616.2 | 125.7 | 798.8 | 2002.8 |
| 1-Butene | 25.7 | 396.7 | 3.8 | 21.8 | 63.1 |
| Isobutene | 2.1 | 32.6 | 0.317 | 1.8 | 5.2 |
| c-2-Butene | 0.950 | 17.3 | 0.141 | 0.809 | 2.4 |
| t-2-Butene | 1.2 | 20.5 | 0.173 | 0.993 | 2.9 |
| n-Butane | 1.9 | 33.2 | 0.283 | 1.6 | 4.8 |
| i-Butane | 4.7 | 67.4 | 0.697 | 4.0 | 11.3 |
| n-Hexane | 0.124 | 9.0 | 3.71E–03 | 0.120 | 0.556 |
| n-Octane | 0.071 | 21.0 | 2.14E–03 | 0.069 | 0.388 |
| N2 | 0.112 | 0.175 | 0.094 | 0.018 | 0.056 |

A comparison of the compositions of streams. 201 and 220 in the table shows that with the help of the invention it is possible to remove 99% of the hydrogen of stream 201 and, of the accumulating lower hydrocarbons, approx. one-half of the methane and over 30% of the ethane.

What is claimed is:

1. A process for the production of polyolefins in a reactor system, which comprises at least two reactor units, wherein at least one of the reactors is a gas phase reactor (B), in which at least one monomer is polymerized, said process comprising directing effluent of reactor unit (A) in a first stream into the at least one gas phase reactor (B), subjecting the effluent to a phase change by lowering the pressure of the effluent by at least 1 bar, whereby a liquid, if present containing unreacted light hydrocarbons and hydrogen is partly vaporized out from the effluent in a vaporization step in a first vaporizer to form an unvaporized liquid portion and a gas portion containing light hydrocarbons and hydrogen, and separating hydrogen from said gas portion by membrane separation in a hydrogen separation step to form a stream comprising hydrogen and a second stream containing reduced hydrogen content.

2. The process according to claim 1, wherein a third stream which is fed into a gas-phase reactor (B') is a circulation as of said gas-phase reactor (B'), wherein said gas phase reactor (B') is optionally identical to the gas phase reactor (B).

3. The process according to claim 1, wherein the second stream containing reduced hydrogen content, is condensed and combined with an unvaporized portion of effluent obtained from a vaporizer to form the first stream before the first stream is fed into the gas-phase reactor (B).

4. The process according to claim 1, wherein said reactor unit (A) is a polymerization reactor and wherein a fluid portion of the first stream from the polymerization reactor is valorized in at least one vaporizer.

5. The process according to claim 1, wherein the second stream containing reduced hydrogen content is at least in part returned to the gates-phase reactor (B).

6. The process according to claim 1, wherein the vaporization and hydrogen separation steps are repeated at least once.

7. The process according to claim 1, wherein at least two vaporizers arranged in series are used, and wherein the liquid portion from the first vaporizer in the series is combined with an unvaporized portion of an effluent from the second vaporizer in the series.

8. The process according to claim 1, wherein the second stream containing reduced hydrogen content obtained by membrane separation is cooled before being combined with the unvaporized liquid portion formed in the vaporization step.

9. The process according to claim 1, wherein the polyolefin product is recovered from the gas-phase reactor (B).

10. The process according to claim 1, wherein reactor unit (A) is a liquid-phase reactor or a reactor which is maintained at supercritical conditions.

11. The process according to claim 1, in which the gas-phase reactor (B) contains gas having a composition which can be changed thereby changing a grade of the polyolefin product, wherein a gas stream is withdrawn from the. gas-phase reactor (B) and is fed to a membrane separator, a hydrogen-containing stream is separated from the gas stream by means of the membrane separator to form a gas stream having reduced hydrogen content, the gas stream being fed to the membrane separator has a composition which corresponds to the composition in the gas-phase reactor (B) Smith regard to small-molecular components, and the gas stream having reduced hydrogen content is returned to the gas-phase reactor (B).

12. The process according to claim 11, wherein the gas stream directed to the membrane separator contains at least hydrogen and lower alkanes, and optionally nitrogen and unreacted monomers.

13. The process according to claim 12, wherein the composition of the gas stream introduced to the membrane separator corresponds to the composition of that in the gas-phase reactor (B), at least with regards to the ratio of hydrogen and lower alkanes.

14. The process according to any one of claims 11, 13 wherein an effluent of the gas-phase reactor (B) is divided into a polymer product and a reject containing gaseous compounds, the reject is separated from the polymer product at a pressure substantially lower than that in the gas-phase reactor (B), and a hydrogen-containing stream is separated from the reject with a membrane separator.

15. The process according to claim 14, wherein the pressure of the effluent of the gas-phase reactor (B) is lowered using a pressure-lowering valve, and the reject is separated from the polymer product in a separator.

16. The process according to claim 11, wherein a gas stream is withdrawn from a top of the gas-phase reactor (B), and is separated into a hydrogen stream and a reject stream using a membrane separator.

17. The process according to claim 16, wherein the reject stream obtained from the separator, contains gaseous compounds, and is recombined with the gas stream withdrawn from the top of the reactor.

18. The process according to claim 17, wherein hydrogen is separated from the reject stream before the reject stream is recombined with the gas stream withdrawn from the top of the reactor.

19. The process according to claim 1, further comprising:

withdrawing a first gas stream containing at least some amount of unreacted monomer from the gas-phase reactor (B), said first gas stream is directed to a heat exchanger wherein said first gas stream is cooled to a first condensation temperature in order to condense said first gas stream at least partly and to separate liquid from the gas to form a second gas stream containing uncondensed gases, and returning at least a portion of the liquid to the gas-phase reactor (B), and wherein a liquid stream and uncondensed compounds are separated from the second gas stream in a membrane separation unit.

20. A process according to claim 19, wherein a circulating gas of a gas-phase reactor (B') is fed into the gas-phase reactor (B'), wherein gas-phase reactor (B') is optionally identical to the gas phase reactor (B), and wherein the second gas stream containing uncondensed gases is treated in a first membrane separator unit and a second membrane separator unit in succession.

21. The process according to claim 20, wherein a gas stream obtained from the first membrane separator unit is cooled to a second condensation temperature in order to separate a condensed portion from the gas, and the gas is directed to either the second membrane separation unit or to distillation.

22. The process according to any one of claims 20 and 21, wherein the first membrane separator unit and the second membrane separator unit have different membrane materials.

23. The process according to claim 22, wherein the second gas stream containing uncondensed gases is treated first with a hydrocarbon-selective membrane and then with a hydrogen-selective membrane.

24. The process according to claim 19, wherein 20–95% of uncondensed compounds present in the second gas stream are separated therefrom to form a third gas stream.

25. The process according to claim 19, wherein the second gas stream is divided by membrane separation into a third gas stream, which contains 20–95% of uncondensed compounds of the second gas stream, and a fourth gas stream.

26. The process according to claim 25, wherein at least a portion of the third gas stream is fed into the gas-phase reactor (B).

27. The process according to claim 26, wherein the third gas stream is condensed in part to form a condensed portion.

28. The process according to claim 27, wherein at least a part of the condensed portion of the third gas stream is fed into the gas-phase reactor (B).

29. The process according to claim 28, wherein the condensed portion is combined with a liquid stream before the liquid stream is fed into the gas-phase reactor (B).

30. The process according to claim 29, wherein said liquid stream comprises a liquid stream from the polymerization reactor (A), the liquid condensed from the first gas stream or a liquid stream condensed from the fourth gas stream.

31. The process according to claim 24, wherein an uncondensed portion of the third gas stream is directed to membrane separation.

32. The process according to claim 25, wherein an uncondensed portion of the fourth gas stream is combined with the third gas stream in crier to produce a combined gas stream.

33. The process according to claim 32, wherein pressure of the combined gas stream is raised using a compressor, and then the combined gas stream is directed to a condenser in order to divide the combined gas stream into a fifth gas stream which contains uncondensed compounds and condensed liquid stream.

34. The process according to claim 33, wherein the fifth gas stream is directed to a membrane separator in order to separate hydrogen from hydrocarbons thereby forming a hydrogen-containing stream and a hydrocarbon-containing stream, whereupon the hydrogen-containing stream is returned to reactor unit (A).

35. The process according to claim 19, wherein a sixth gas stream, which is obtained by separating products of a fluidized-bed reactor, is combined with the first gas stream.

36. The process according to claim 35, further comprising:

dividing the effluent of the reactor unit (A) which has been directed to a separator, into a product stream which contains polymer and a sixth gas stream which contains gaseous compounds, and the sixth gas stream is combined with the first gas stream withdrawn from the reactor unit (A).

37. The process according to claim 1, wherein the effluent is subjected to a phase change by lowering pressure of the effluent by at least 10% of the pressure of the reactor unit (A).

* * * * *